Patented Feb. 6, 1934

1,946,259

UNITED STATES PATENT OFFICE 1,946,259

PROCESS FOR THE PREPARATION OF ALIPHATIC ORGANIC ACIDS

Gilbert B. Carpenter, Wilmington, Del., assignor, by mesne assignments, to E. I. du Pont de Nemours & Company, Wilmington, Del., a corporation of Delaware No Drawing. Application March 21, 1931
Serial No. 524,416

12 Claims. (Cl. 260—116)

This invention relates to a process for the formation of organic compounds and particularly to the preparation of monocarboxylic acids by the interaction of aliphatic alcohols and carbon monoxide in the presence of a catalyst.

It is known that organic acids and esters can be prepared by the interaction, in the vapor or liquid phase, of organic compounds with the oxides of carbon. For example, it has been shown that by the condensation of methyl alcohol with carbon monoxide in the presence of a suitable catalyst acetic acid, methyl acetate, and methyl formate may be prepared in proportions which are governed by the particular operating conditions. Acids have likewise been prepared from methane and carbon monoxide, from carbon monoxide and water vapor, and from ethers and carbon monoxide. Investigators have experienced considerable difficulty in their attempts to find, for these reactions, a catalyst which under given operating conditions would produce a good yield of the acid or other compound desired. Some of the catalysts which have been suggested include the hydrogenating and hydrating catalysts alone or in combination, metal acetate catalysts which split off acetic acid under 450° C., and acid catalysts, such as phosphoric acid and its acid salts.

There are numerous disadvantages in the employment of the before-mentioned catalysts, however. For instance, when the hydrogenating and hydrating catalysts are employed, particularly if acetic acid is the desired end product, but low yields of that acid result. With the metal acetate catalysts which decompose and split off acetic acid, frequent reactivation is required which renders their use uneconomical from the commercial standpoint. When the liquid acid catalysts are utilized, difficulties in supporting them and maintaining their initial activity are encountered.

An object of this invention is to provide a process for the preparation of higher molecular weight organic compounds thru the introduction of carbon monoxide into the lower molecular weight organic compounds. A further object of this invention is to provide a process for the preparation of monocarboxylic acids by the condensation of aliphatic alcohols with carbon oxides in the presence of a catalyst. Another object of this invention is to provide a process for the preparation of acids having the structural formulæ—$C_nH_{2n+1}COOH$—from alcohols having the structural formulæ—$C_nH_{2n+1}OH$—by subjecting the alcohols to the action of carbon monoxide in the presence of hydrogen acids of Group VII—B of the periodic table in conjunction with the halides and/or sulfates of the elements of Group II of the periodic table including manganese. Other objects will hereinafter appear.

It has been found that organic acids can be prepared by the interaction of the aliphatic alcohols and carbon monoxide by passing the vaporized alcohols together with carbon monoxide over a catalyst comprising the hydrogen acids of Group VII—B of the periodic table in conjunction with the halides and/or sulfates of manganese or with similar salts of the elements of Group II of the periodic table. The compounds referred to herein as hydrogen acids are, strictly speaking, not considered as acids unless in water solution. It will be understood that I am referring by the term hydrogen acids to those hydrogen compounds of Group VII—B which, when dissolved in water, yield hydrogen ions. These catalysts may be used in conjunction with the inert materials such as pumice, kieselguhr, etc. Alternatively, they may first be mixed with the alcohol and subsequently injected into the catalytic reaction chamber wherein the mixture is subjected to an elevated temperature and pressure; the inert materials referred to above may or may not be present. The carbon monoxide may be injected into the stream of alcohol and catalyst at any point prior to its entering the catalyst chamber or, for that matter, it may be added within the chamber.

The alcohol-carbon monoxide reactions which can be accelerated by the above described catalysts may be expressed as follows:

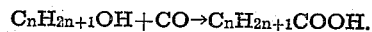
$$C_nH_{2n+1}OH + CO \rightarrow C_nH_{2n+1}COOH.$$

In accordance with the particular operating conditions, it will be found that, in some instances, the acid may not be formed directly in the free state, but may be produced as an ester by condensation of the acid formed with the particular alcohol used in the process, as indicated below:

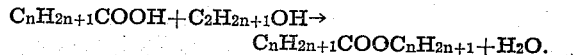
$$C_nH_{2n+1}COOH + C_2H_{2n+1}OH \rightarrow$$
$$C_nH_{2n+1}COOC_nH_{2n+1} + H_2O.$$

The alcohol used may be replaced, if desired, wholly or partly by the corresponding alkyl ethers of the alcohol, such as dimethyl ether, diethyl ether, or the mixed alkyl ethers, the alkyl esters, or other compounds containing one or more hydrolyzable alkoxy groups.

The synthesis can generally be efficiently carried out under the following operating conditions. The pressure may vary from approximately 25 atmospheres to 900 atmospheres or higher with the preferable operating range in the neighborhood of 350-700 atmospheres. The temperature within the reaction zone is quite critical as it determines to a large extent the product obtained. For example, when the methanol-carbon monoxide reaction is conducted at temperatures below 300° C. a low yield of methyl acetate will be obtained. While, on the other hand, at temperatures above 300° C. the yield of methyl acetate will increase with a corresponding decrease in the proportion of the parasitic products.

The carbon monoxide used may be obtained from various commercial sources, such, for example, as from water-gas, producer gas, coke oven gas, and the like, but to obtain products of the highest degree of purity it is preferable to remove from such commercial gases the objectionable constituents, such as sulfur compounds, metal carbonyls, etc.

The presence of inert gases in the alcohol-carbon monoxide mixture is sometimes desirable. Nitrogen, for instance, has little deleterious effect on the reaction or yield and, in fact, may be advantageously used in order to aid in the temperature control and to prevent too great a conversion of the alcohol and carbon monoxide on one pass through the conversion apparatus. Other strictly inert gases will usually act similarly to nitrogen. It is, of course, understood that instead of introducing methanol itself into the reaction chamber substances or mixtures of substances which decompose to form alcohols or esters may be employed, but generally I prefer to introduce methanol directly into the gas stream leading to the converter.

My process can be conveniently carried out by passing purified carbon monoxide into methanol preferably containing water, maintained at such a temperature that the issuing gases will have the requisite proportion of methanol, carbon monoxide and water vapor. I have found that a gaseous composition, containing an excess of carbon monoxide over the methanol vapor, will give a good yield of acetic acid and ester on one pass through a converter containing my adsorbing catalyst,—the temperature of the reaction chamber being maintained at approximately 300° C. and the pressure held in the neighborhood of 350 atmospheres.

Not only can methanol be catalyzed in the presence of carbon monoxide and my catalyst to acetic acid or the condensation product of the acetic acid with methanol, i. e. methyl acetate, but the higher alcohols, such as ethyl alcohol, propyl alcohol, butyl alcohol, and even the higher molecular weight alcohols, such, for example, as hexyl alcohol or octyl alcohol, may be similarly converted into an acid having correspondingly one more carbon atom than the alcohol treated. In fact, my process and catalyst may be employed with any of the monohydric alcohols, providing these alcohols volatilize without decomposition. When converting the higher aliphatic alcohols, some of which are not water soluble, and particularly if water is desired in the reaction, it is preferable to introduce the alcohol and water into the carbon monoxide as a vapor or spray. Any other suitable procedure may be employed, however, for intimately commingling the vapors of the alcohol and water with the oxide of carbon. When preparing products from the higher molecular weight compounds I may utilize in lieu of the alcohol the ether or ester thereof, the use of which will modify, to some extent, the type of product obtained.

I will now describe a specific embodiment of my process, but it will be understood that the details therein given and the compounds employed, either as reactants or catalysts, in no way restrict the scope of this invention, but merely illustrate one manner in which my process may be carried out.

*Example.*—A gaseous mixture, containing 85% carbon monoxide, and 5% each of methyl alcohol, water vapor, and hydrogen, is passed together with hydrogen chloride over zinc chloride disposed in a conversion chamber suitable for the carrying out of exothermic gaseous reactions. The gas mixture is passed into the chamber at a temperature of 300° C. and a pressure of 700 atmospheres. The condensate obtained upon cooling the converted gases contains a good yield of acetic acid and its ester.

The apparatus, which may be employed for conducting these reactions, may be of any conventional type and preferably one in which the temperature of the exothermic reaction can be readily controlled at the optimum value. Owing to the corrosive action of acetic acid, the interior of the converter and apparatus leading therefrom should preferably be protected. This may be accomplished by using glass or glass-lined apparatus or by plating the inner surfaces thereof with chromium or silver or using for the construction of this equipment acid resisting high alloy steels containing, for example, high molybdenum, cobalt, tungsten, chromium, manganese, or nickel content.

From a consideration of the above specification it will be realized that any process in which a carbon oxide is combined with an organic compound giving a product containing a negative radical of an aliphatic acid, and particularly those in which monohydric alcohols are converted to monocarboxylic acids, will come within the scope of this invention when such reactions are accelerated in the presence of hydrogen acids of Group VII—B of the periodic table together with the halides and/or sulfates of Group II including manganese.

I claim:

1. A process for the preparation of aliphatic organic acids which comprises contacting a compound containing at least one hydrolyzable alkoxy group and carbon monoxide with a hydrogen halide in conjunction with the halide of a metal of the group consisting of the metals of Group II of the periodic table and manganese at reacting temperature.

2. A process for the preparation of aliphatic organic acids which comprises contacting carbon monoxide and a compound selected from the group consisting of a monohydroxy aliphatic alcohol, the alkyl ethers, and the alkyl esters, with a halogen halide in conjunction with the halide of a metal of the group consisting of the metals of Group II of the periodic table and manganese at reacting temperature.

3. A process for the preparation of aliphatic organic acid which comprises contacting an aliphatic alcohol which is not substantially decomposed when vaporized and carbon monoxide with a hydrogen halide in conjunction with the halide of a metal of the group consisting of the metals of Group II of the periodic table and manganese at reacting temperature.

4. A process for the preparation of aliphatic organic acid which comprises contacting carbon monoxide and a monohydroxy aliphatic alcohol which is not substantially decomposed when vaporized with a catalyst comprising a hydrogen halide in conjunction with a supported catalyst consisting of the halide of a metal of the group consisting of the metals of Group II of the periodic table and manganese at reacting temperature.

5. A process for the preparation of acetic acid which comprises contacting methanol and carbon monoxide with a hydrogen halide in conjunction with the halide of a metal of the group consisting of the metals of Group II of the periodic table and manganese at reacting temperature.

6. A process for the preparation of acetic acid which comprises passing methanol and carbon monoxide at an elevated temperature and pressure over a hydrogen halide in conjunction with the halide of a metal of the group consisting of the metals of Group II of the periodic table and manganese at reacting temperature.

7. A process for the preparation of acetic acid which comprises passing methanol and carbon monoxide at an elevated temperature and pressure over a hydrogen halide in conjunction with a supported catalyst consisting of the halide of a metal of the group consisting of the metals of Group II of the periodic table and manganese at reacting temperature.

8. In a vapor phase process for the preparation of aliphatic organic acids from compounds containing at least one hydrolyzable alkoxy group and carbon monoxide, the step which comprises effecting the reaction in the presence of a hydrogen halide catalyst in conjunction with the halide of a metal of the group consisting of the metals of Group II of the periodic table and manganese.

9. In a vapor phase process for the preparation of saturated aliphatic monocarboxylic acids from saturated monohydroxy aliphatic alcohols and carbon monoxide, the step which comprises effecting the reaction in the presence of a hydrogen halide catalyst in conjunction with the halide of a metal of the group consisting of the metals of Group II of the periodic table and manganese.

10. In a process for the preparation of acetic acid from methanol and carbon monoxide in the vapor phase, the step which comprises effecting the reaction in the presence of a catalyst consisting of a hydrogen halide in conjunction with the halide of a metal of the group consisting of the metals of Group II of the periodic table and manganese.

11. A process for the preparation of acetic acid which comprises mixing hydrogen chloride with methanol and subsequently passing the resulting mixture together with carbon monoxide over a zinc chloride catalyst.

12. In a process for the preparation of acetic acid from methanol and carbon monoxide the step which comprises effecting the reaction in the presence of a catalyst consisting of hydrogen chloride in conjunction with zinc chloride.

GILBERT B. CARPENTER.